(12) United States Patent
Makartchouk

(10) Patent No.: US 11,434,815 B2
(45) Date of Patent: Sep. 6, 2022

(54) ENGINE WITH ISOCHORIC COMBUSTION

(71) Applicant: International Engine Intellectual Property Company, LLC, Lisle, IL (US)

(72) Inventor: Andrei Makartchouk, Hinsdale, IL (US)

(73) Assignee: International Engine Intellectual Property, LLC, Lisle, IL (US)

( * ) Notice: Subject to any disclaimer, the term of this patent is extended or adjusted under 35 U.S.C. 154(b) by 115 days.

(21) Appl. No.: 17/087,989

(22) Filed: Nov. 3, 2020

(65) Prior Publication Data
US 2022/0136432 A1 May 5, 2022

(51) Int. Cl.
*F02B 75/32* (2006.01)
*F16H 21/18* (2006.01)
*F16C 7/02* (2006.01)

(52) U.S. Cl.
CPC .............. *F02B 75/32* (2013.01); *F16C 7/023* (2013.01); *F16H 21/18* (2013.01); *F02B 2275/36* (2013.01)

(58) Field of Classification Search
CPC ........ F02B 75/32; F02B 2275/36; F16C 7/023; F16H 21/18; F16H 21/32
See application file for complete search history.

(56) References Cited

U.S. PATENT DOCUMENTS

| | | | |
|---|---|---|---|
| 2007/0289567 A1* | 12/2007 | Eto | F02B 75/32 123/192.1 |
| 2021/0317780 A1* | 10/2021 | Zhou | F02B 57/08 |

\* cited by examiner

*Primary Examiner* — Jacob M Amick
(74) *Attorney, Agent, or Firm* — Jack D. Nimz; Mark C. Bach

(57) ABSTRACT

An Engine with Isochoric Combustion has pistons arranged within cylinders, connecting rods connected to the pistons and to upper joints of triangle links, and a crankshaft with crankpins offset from the centerline of the crankshaft by crank arms. The triangle links are connected to the crankpins at additional joints of the triangle links. Radius links are pivotally connected to the engine by pivot pins at one end and to the triangle links at a further joint of the triangle links at their other end. By way of geometry of the linkages defined by the crank arms, the triangle links, the radius links, and the connecting rods, and by way of the relative positions of the crankshaft, the cylinders, and the pivot pins, during a crank angle segment, the Cylinder Volume during the combustion event is characterized by an extended dwell.

18 Claims, 5 Drawing Sheets

ENGINE WITH ISOCHORIC COMBUSTION

BACKGROUND

This disclosure relates to engines, and in particular to engines for commercial ground vehicles, in which the expansion stroke of the thermodynamic work-producing piston engine is characterized by an extended period of dwell at or near top dead center as fuel is injected and combustion takes place. Further, it relates to such an engine that is provided with a linkage that converts reciprocating motion into rotational motion while exhibiting this extended period of dwell at or near top dead center, and a method for the use thereof.

RELATED ART

Reciprocating internal combustion engines are well known in the art. Such reciprocating internal combustion engines include Otto cycle engines, Diesel cycle engines, Stirling cycle engines, Atkinson cycle engines, and etcetera. Generally, such reciprocating internal combustion engines use a piston, crankshaft, and single connecting rod to convert the reciprocating motion into rotational motion. As a result, the motion of the piston is generally sinusoidal, so that, among other characteristics, the period of combustion of the injected fuel takes place during the initial period of expansion of the working gas. Increasingly, reciprocating internal combustion engines utilize multiple individual fuel injection events at or near the Top Dead Center (TDC) position of the piston during each power stroke. This is done in order to more precisely control the fuel combustion process and to increase efficiency and lower harmful exhaust emissions of the engine.

However, the fixedly sinusoidal motion of the piston presents a limitation upon the maximum efficiency achievable by known reciprocating internal combustion engines. Furthermore, due to the ongoing downward motion of the piston during the combustion process, control of the conditions of the combustion process is often compromised, resulting in higher peak combustion temperatures, increased nitrogen oxide (NOx) production, the loss of usable heat as waste heat, and reduced overall engine efficiency.

Accordingly, there is an unmet need for an arrangement and method for modifying the motion of the piston from a fixedly sinusoidal motion to a motion that is more conducive for controlling the combustion process.

SUMMARY

According to one embodiment of the Engine with Isochoric Combustion, a vehicle has an engine with at least one piston arranged within at least one cylinder. A crankshaft has at least one crankpin offset from the centerline of the crankshaft by at least one crank arm. A connecting rod is connected to the at least one piston and to an upper joint of a triangle link. The triangle link is connected to the at least one crankpin at a second joint of the triangle link. A radius link is pivotally connected to the engine by a pivot pin at one end and connected to the triangle link at a third joint of the triangle link at its other end.

According to another embodiment of the Engine with Isochoric Combustion, an engine has at least one piston arranged within at least one cylinder. A crankshaft has at least one crankpin offset from the centerline of the crankshaft by at least one crank arm. A connecting rod is connected to the at least one piston and to an upper joint of a triangle link. The triangle link is connected to the at least one crankpin at a second joint of the triangle link. A radius link is pivotally connected to the engine by a pivot pin at one end and connected to the triangle link at a third joint of the triangle link at its other end.

According to another embodiment of the Engine with Isochoric Combustion, a method of isochoric combustion in an engine includes several steps. The first step is arranging a piston within a cylinder. The second step is providing a crankshaft with at least one crankpin offset from the centerline of the crankshaft. The third step is connecting a connecting rod to the at least one piston and to an upper joint of a triangle link. The fourth step is connecting the triangle link to the at least one crankpin at a second joint of the triangle link. The fifth step is pivotally connecting a radius link to the engine by a pivot pin at one end and to the triangle link at a third joint of the triangle link at its other end.

DETAILED DESCRIPTION

Figure 1:
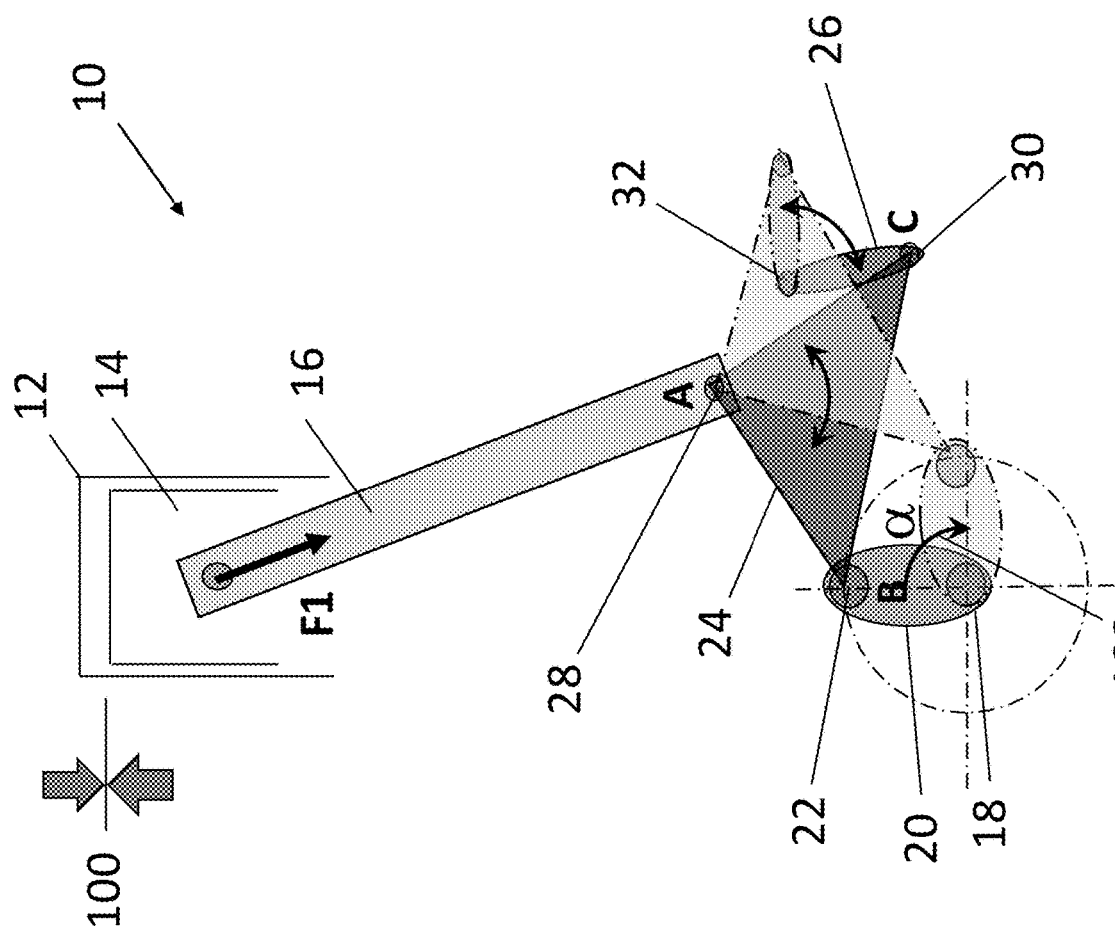
FIG. 1 is an illustration of an embodiment of the Engine with Isochoric Combustion of the present disclosure, as described herein.

Embodiments described herein relate to an Engine with Isochoric Combustion and methods for the use thereof. The engine and its method of use may be applied to various types of stationary applications, marine applications, passenger vehicles, and commercial vehicles and recreational vehicles, such as highway or semi-tractors, straight trucks, busses, fire trucks, agricultural vehicles, motorhomes, rail travelling vehicles, and etcetera. It is further contemplated that embodiments of the Engine with Isochoric Combustion and methods for the use thereof may be applied to engines configured for various fuels, such as gasoline, diesel, propane, natural gas, and hydrogen, as non-limiting examples. The several embodiments of the Engine with Isochoric Combustion and method for the use thereof presented herein are employed on vehicles utilizing the Otto cycle or the Diesel cycle, but this is not to be construed as limiting the scope of the engine and its method of use, which may be applied to engines of differing construction.

Embodiments of the Engine with Isochoric Combustion and methods for the use thereof disclosed herein provide for constant cylinder volume or nearly constant cylinder volume during the combustion phase of a reciprocating internal combustion engine, it being understood that the term "isochoric combustion" as used herein includes constant cylinder volume and/or nearly constant cylinder volume during the combustion phase. By providing for constant cylinder volume or nearly constant cylinder volume during the combustion phase, embodiments of the Engine with Isochoric Combustion of the present disclosure increase the overall fuel efficiency of an engine so equipped as compared to engines of conventional construction. By implementing multiple fuel injection events while preserving constant cylinder volume or nearly constant cylinder volume, embodiments of the Engine with Isochoric Combustion of the present disclosure further increase overall fuel efficiency by way of improving control of fuel combustion conditions and processes, while lowering peak combustion temperatures and thereby reducing NOx and other harmful exhaust emissions. This results in further reduced fuel consumption and reduced Green House Gas (GHG) emissions.

Embodiments of the Engine with Isochoric Combustion and methods for the use thereof are provided with a piston that reciprocates within a cylinder or cylinder liner. A piston is connected to a connecting rod. A crankshaft having at least one crank arm converts the reciprocating motion of the piston into rotational motion of the crankshaft as the engine progresses through the intake, compression, combustion, and exhaust strokes of, for non-limiting example, an Otto cycle or Diesel cycle thermodynamic process. Rather than the connecting rod being connected directly to the at least one crank arm of the crankshaft as in convention reciprocating internal combustion engines, embodiments of the Engine with Isochoric Combustion and methods for the use thereof are provided with an additional triangle link and radius link, as will be shown.

The connecting rod, then, is connected to an upper joint of the triangle link, and the crankpin of the at least one crank arm is connected to a lower joint of the triangle link. Another lower joint of the triangle link is connected to a radius link, which radius link pivots about a pivot pin that is fixed to the structure of the engine. As a result of the geometry of the crank arm, the triangle link, the radius link, and the connecting rod, the motion of the piston within the cylinder of the Engine with Isochoric Combustion of the present disclosure is not sinusoidal as a function of the crankshaft angle. Rather, the piston of the Engine with Isochoric Combustion of the present disclosure experiences an extended dwell at or near its top dead center position while rotation of the crankshaft proceeds. This allows the cylinder volume to remain constant or nearly constant during the active phase of fuel combustion, i.e.—resulting in Isochoric combustion, while simultaneously producing a rotating force on the crankshaft. The design of the Engine with Isochoric Combustion of the present disclosure further allows for multiple fuel injections during the very long dwell of the piston at its top dead center position.

As illustrated, the geometry of the crank arm, the triangle link, the radius link, and the connecting rod results in extended dwell of the piston at or near its top dead center position while rotation of the crankshaft proceeds, as noted previously. That being said, the specific kinematics of the model are amenable to perfecting by way of reasonable experimentation and calculation of its geometries, according to the amount of dwell desired in order to accommodate the full stage of active fuel combustion in the cylinder. Such extended dwell during the combustion process not only results in Constant volume (Cv) combustion, but also continues to produce mechanical work upon the crankshaft during the Cv combustion process. Furthermore, the specific geometry of the design may be modified in order to adjust the crankshaft angle (CA) dedicated to the Cv combustion process.

Figure 2:
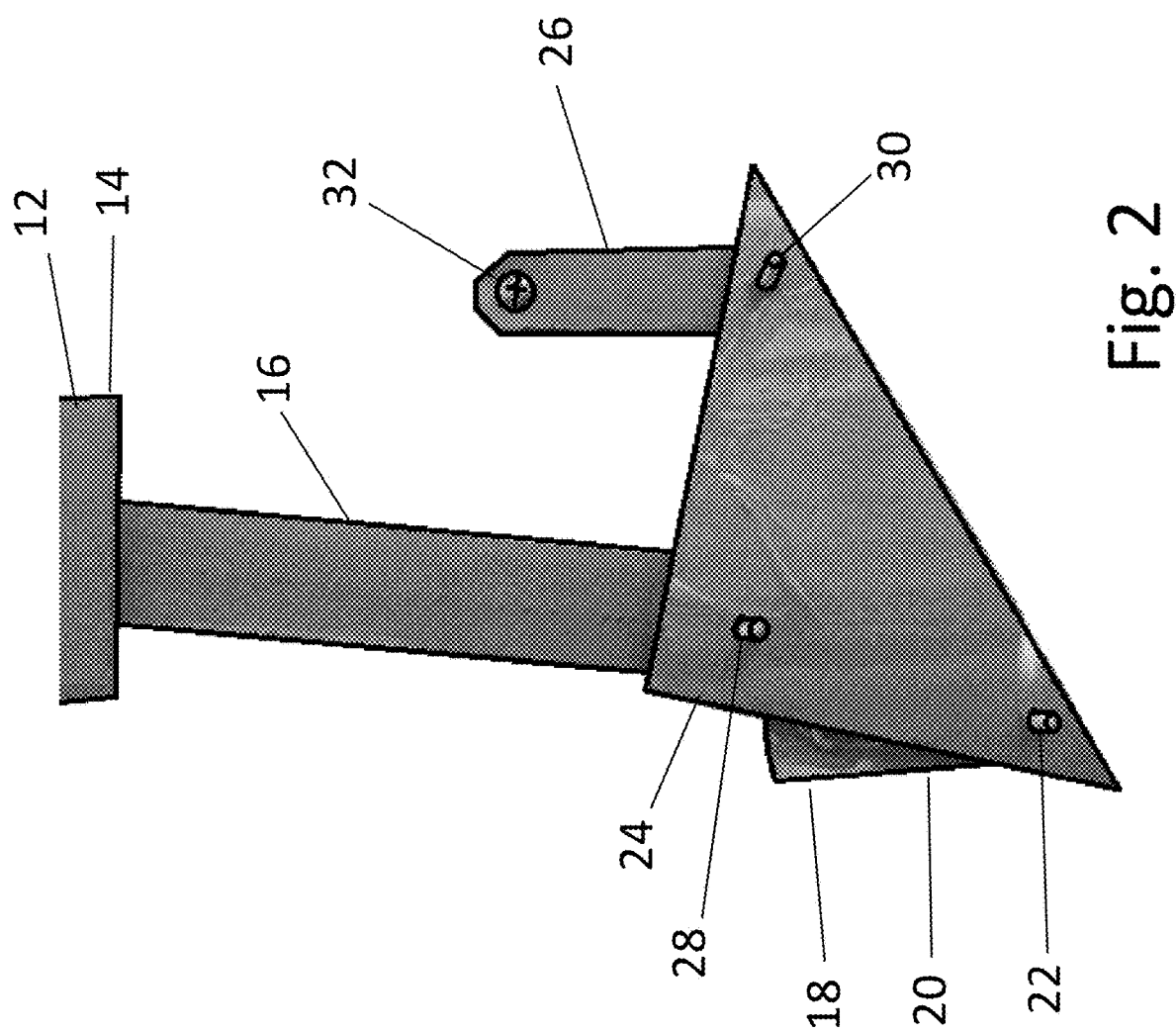
FIG. 2 is an illustration of an embodiment of the Engine with Isochoric Combustion of the present disclosure, as described herein.

Turning now to FIGS. 1 and 2, a graphic representation of an engine 10 according to an embodiment of the Engine with Isochoric Combustion of the present disclosure is shown in end views. The engine 10 is provided with at least one piston 14 reciprocally disposed within at least one cylinder 12. The at least one piston 14 is connected to a rotatable crankshaft 18 by way of a connecting rod 16 and a triangle link 24. Specifically, the connecting rod 16 is connected to the at least one piston 14, and is connected to an upper joint 28 between the triangle link 24 and the connecting rod 16 at vertex A of the triangle link 24. The crankshaft 18 rotates on at least one main journal (not shown) and has at least one crankpin 22. The at least one crankpin 22 has an axis that is offset from the at least one main journal by a crank throw distance, which is defined by at least one crank arm 20. The at least one crankpin 22 is connected to the triangle link 24 at vertex B of the triangle link 24. The triangle link 24 is further connected to a radius link 26 by a joint 30 at vertex C of the triangle link 24. The radius link 26, as noted previously, pivots about a pivot pin 32 that is fixed to the structure of the engine 10. By way of the geometry of the linkage defined by the crankshaft 18, the triangle link 24, the radius link 26, and the connecting rod 16, and by way of the relative positions of the crankshaft 18, the at least one cylinder 12, and the pivot pin 32, during the crank angle α segment 102, the Cylinder Volume during combustion remains constant or nearly constant, as indicated by piston travel 100.

Figure 3:
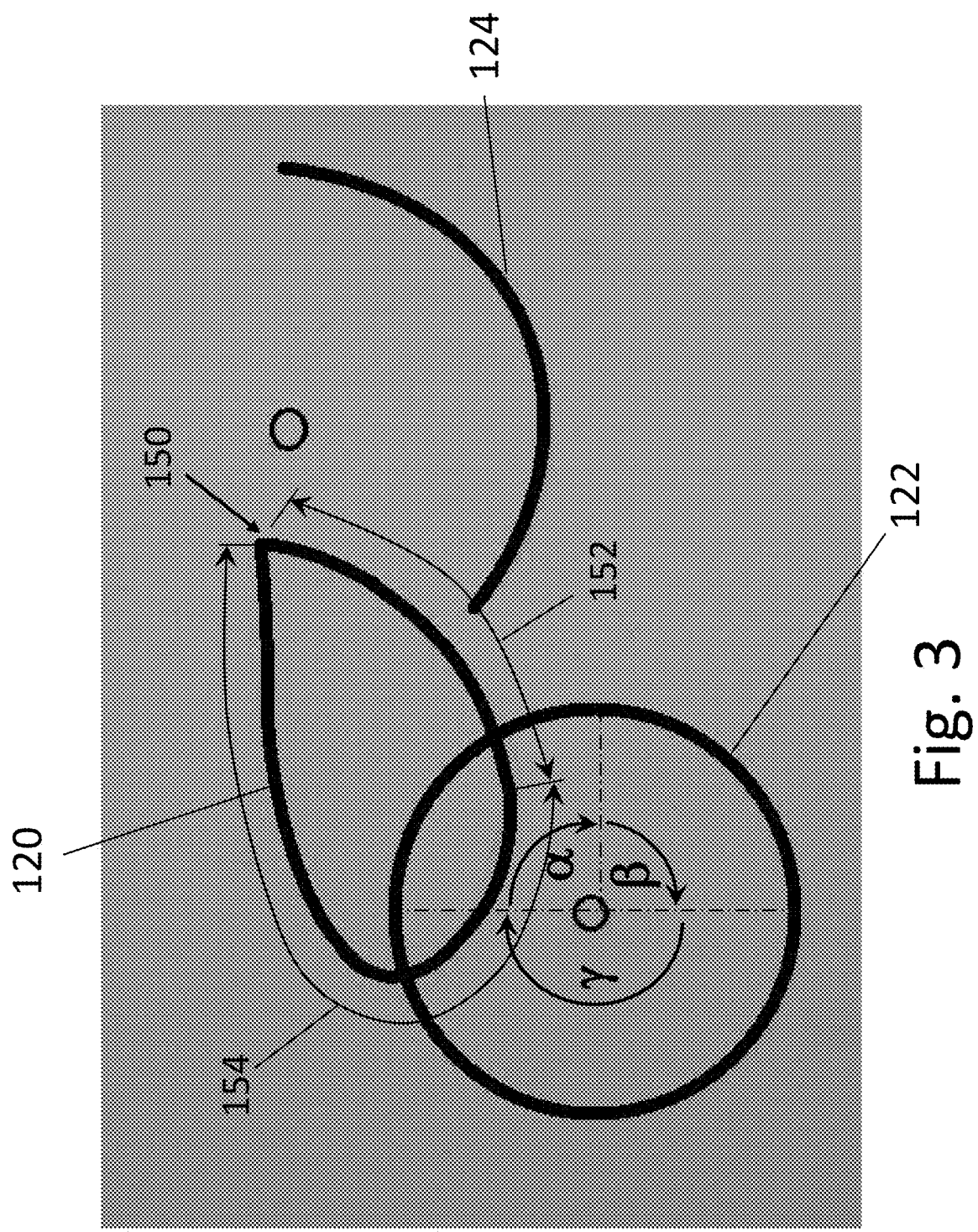
FIG. 3 is an illustration of traces of motion of certain joints in the linkage of an embodiment of the Engine with Isochoric Combustion of the present disclosure during the combustion and exhaust strokes, as described herein.

Turning now to FIG. 3, a graphic representation is shown of traces of motion of certain joints in the linkage of an embodiment of the Engine with Isochoric Combustion of the present disclosure during the combustion and exhaust strokes. Trace 122 shows the path of the joint at vertex B of the triangle link 24 between the at least one crankpin 22 and the triangle link 24 as the embodiment of the Engine with Isochoric Combustion of the present disclosure proceeds through the combustion and exhaust strokes. Trace 120 shows the path of the joint at vertex A of the triangle link 24 between the triangle link 24 and the connecting rod 16 as the embodiment of the Engine with Isochoric Combustion of the present disclosure proceeds through the combustion and exhaust strokes. Trace 124 shows the path of the joint at vertex C of the triangle link 24 between the triangle link 24 and the radius link 26 as the embodiment of the Engine with Isochoric Combustion of the present disclosure proceeds through the combustion and exhaust strokes.

Motion of the joint at vertex A of the triangle link 24 between the triangle link 24 and the connecting rod 16 during the active phase of the fuel combustion process is represented by the trace at 150, wherein such motion is shown to be stationary or nearly stationary while the motion of the joint at vertex B of the triangle link 24 between the at least one crankpin 22 and the triangle link 24 proceeds through angle α. In this way, the combustion process is Isochoric, or constant or nearly constant in volume, i.e.—is characterized by an extended dwell, while the crankshaft 18 continues to rotate. Motion of the joint at vertex A of the triangle link 24 between the triangle link 24 and the connecting rod 16 during the gas expansion process is then represented by the trace at 152, wherein the motion of the joint at vertex B of the triangle link 24 between the at least one crankpin 22 and the triangle link 24 proceeds through angle β. Motion of the joint at vertex A of the triangle link 24 between the triangle link 24 and the connecting rod 16 during the exhaust process is then represented by the trace at 154, wherein the motion of the joint at vertex B of the triangle link 24 between the at least one crankpin 22 and the triangle link 24 proceeds through angle γ.

Accordingly, in a four stroke engine, for non-limiting example an Otto cycle or Diesel cycle engine, the motion of the joint at vertex A of the triangle link 24 between the triangle link 24 and the connecting rod 16 represented by the trace at 150, wherein the motion of the joint at vertex B of the triangle link 24 between the at least one crankpin 22 and the triangle link 24 proceeds through angle α, and the motion of the joint at vertex A of the triangle link 24 between the triangle link 24 and the connecting rod 16 represented by the trace at 152, wherein the motion of the joint at vertex B of the triangle link 24 between the at least one crankpin 22 and the triangle link 24 proceeds through angle β, also functions as the intake stroke of the embodiment of the Engine with Isochoric Combustion of the present disclosure. Likewise, the motion of the joint at vertex A of the triangle link 24 between the triangle link 24 and the connecting rod 16 represented by the trace at 154, wherein the motion of the joint at vertex B of the triangle link 24 between the at least one crankpin 22 and the triangle link 24 proceeds through angle γ, also functions as the compression stroke of the embodiment of the Engine with Isochoric Combustion of the present disclosure.

Figure 4B:
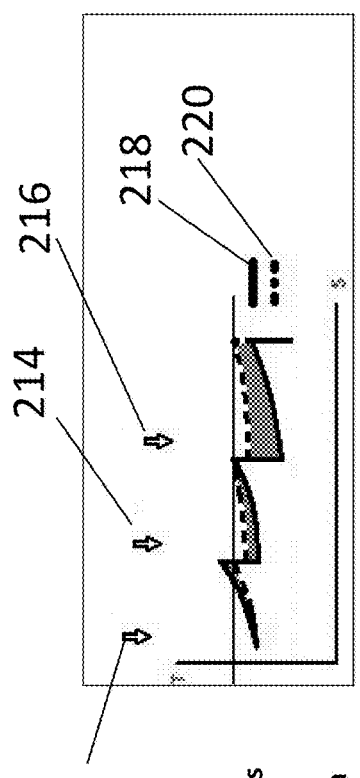
FIG. 4B is a graph showing peak temperatures as a function of entropy in a conventional reciprocating engine having three fuel injection events, and in an embodiment of the Engine with Isochoric Combustion of the present disclosure having three fuel injection events, as described herein.
Figure 4A:
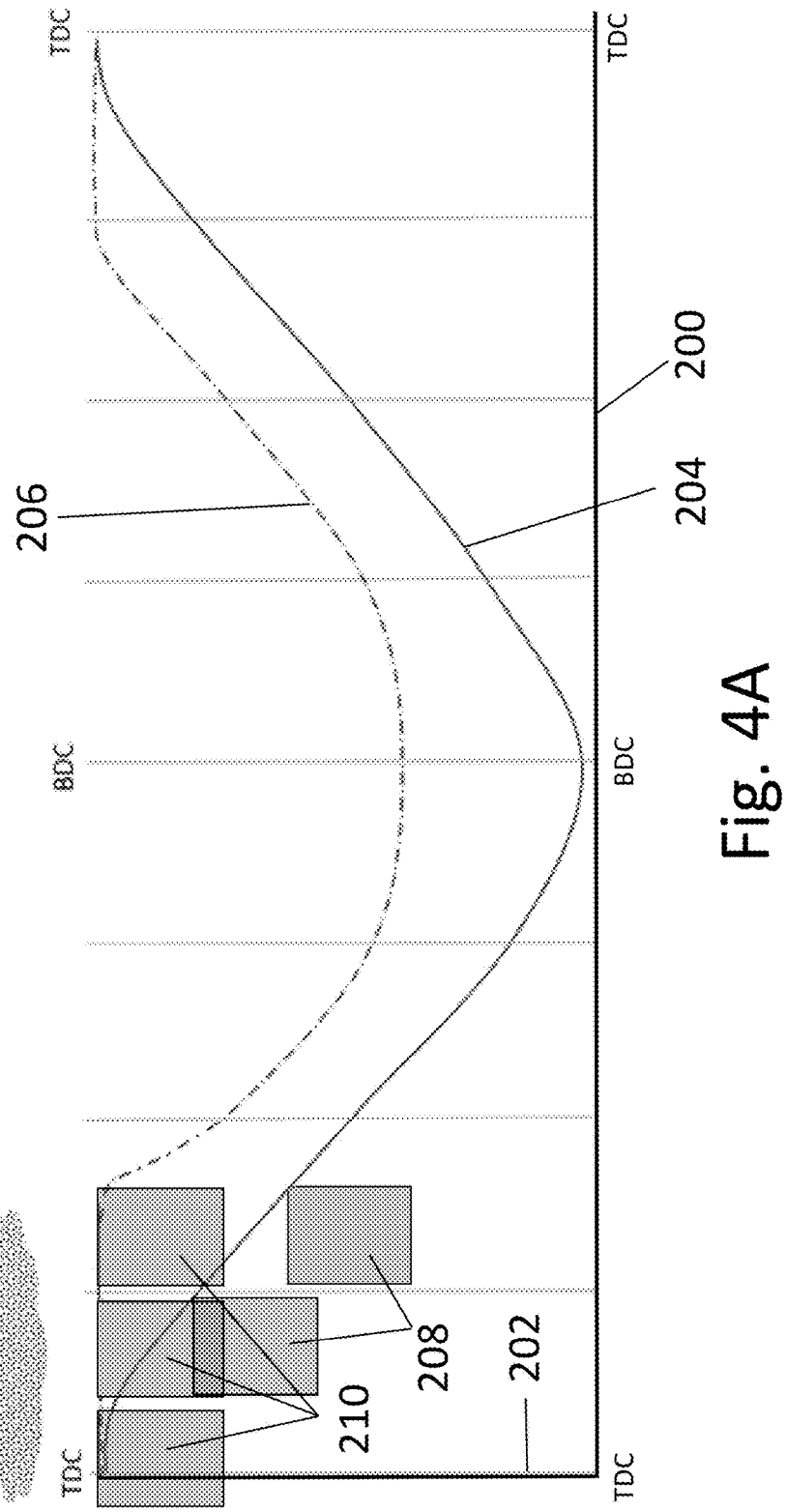
FIG. 4A is a graph showing piston position as a function of crank position, showing exemplary motions of the pistons of a conventional reciprocating engine and of an embodiment of the Engine with Isochoric Combustion of the present disclosure, as described herein.

Turning now to FIG. 4A, a graph is shown of piston location 202 on the vertical axis as a function of crank arm location 200 on the horizontal axis. Line 204 shows a trace of the piston location in an engine of conventional design, whereas line 206 shows a trace of the piston location in an embodiment of the Engine with Isochoric Combustion 10 disclosed herein. Superimposed over the line 204 showing the trace of the piston location in an engine of conventional design are fuel injection events 208, illustrating the fact that such fuel injection events 208 occur even as the expansion process of the combustion stroke has begun. Superimposed over the line 206 showing the trace of the piston location in the embodiment of the Engine with Isochoric Combustion 10 are fuel injection events 210, illustrating the fact that such fuel injection events 210 occur during the extended period of dwell provided by the geometry of the linkage defined by the crankshaft 18, the triangle link 24, the radius link 26, and the connecting rod 16, and by the relative positions of the crankshaft 18, the at least one cylinder 12, and the pivot pin 32. As illustrated by trace 206 and fuel injection events 210, the embodiment of the Engine with Isochoric Combustion 10 allows multiple fuel injections during a very long dwell at piston top dead center, and thereby allows better control of the fuel combustion process, including reducing peak temperature to reduce NOx and other exhaust emissions.

Turning now to FIG. 4B, a graph is shown of combustion temperature T as a function of entropy S with a trace shown for a conventional reciprocating engine 218 and for an embodiment of the Engine with Isochoric Combustion of the present disclosure 220. A first fuel injection event 212, a second fuel injection event 214, and a third fuel injection event 216 are also shown in the graph of FIG. 4B, in which the trace for the conventional reciprocating engine 218 illustrates that higher peak temperatures are achieved, resulting in greater NOx formation. Conversely, the trace for the embodiment of the Engine with Isochoric Combustion of the present disclosure 220 illustrates that peak temperatures are controlled resulting in lower values and lower NOx formation. As a result, with the embodiment of the Engine with Isochoric Combustion of the present disclosure 220, less heat is lost to increase in entropy, resulting in less fuel consumption and lower $CO^2$ emissions.

Figure 5:
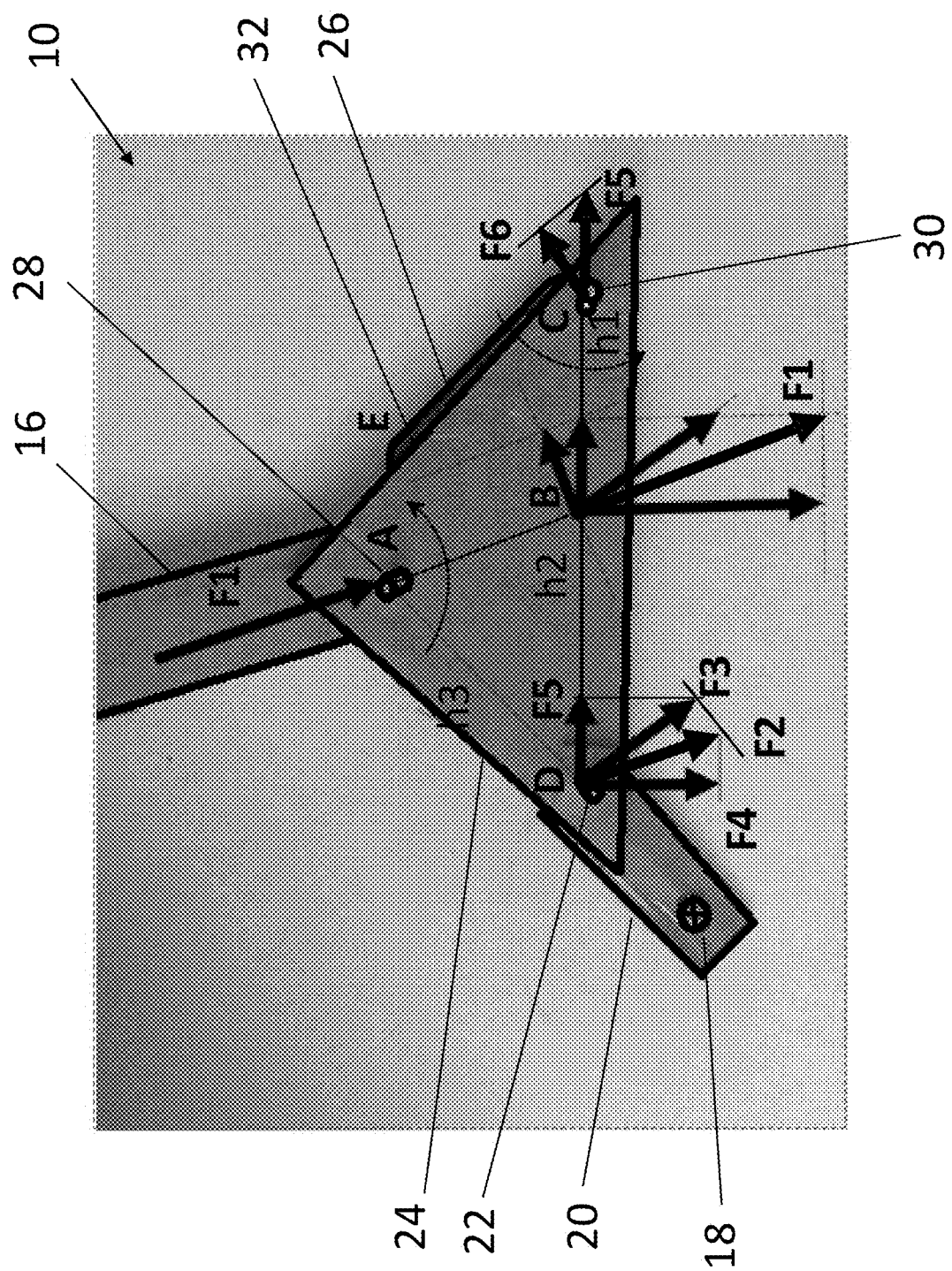
FIG. 5 is an illustration of acting forces at a given crank position of an embodiment of the Engine with Isochoric Combustion of the present disclosure, as described herein.

Turning now to FIG. 5, another embodiment of the Engine with Isochoric Combustion 10 is shown. While the cylinder 12 and the piston 14 are not shown, the connecting rod 16 and triangle link 24 again connect the at least one piston 14 to a rotatable crankshaft 18. As before, the connecting rod 16 is connected to the at least one piston 14, and is connected to an upper joint 28 between the triangle link 24 and the connecting rod 16 at vertex A of the triangle link 24. The crankshaft 18 again rotates on at least one main journal (not shown) and has at least one crankpin 22. The at least one crankpin 22 has an axis that is offset from the at least one main journal by a crank throw distance, which is defined by at least one crank arm 20. The at least one crankpin 22 is connected to the triangle link 24 at a vertex, here labelled D, of the triangle link 24. The triangle link 24 is again connected to a radius link 26 by a joint 30 at vertex C of the triangle link 24. The radius link 26 again pivots about a pivot pin 32 that is fixed to the structure of the engine 10. By way of the geometry of the linkage defined by the crankshaft 18, the triangle link 24, the radius link 26, and the connecting rod 16, and by way of the relative positions of the crankshaft 18, the at least one cylinder 12, and the pivot pin 32, the Cylinder Volume during combustion again remains constant or nearly constant.

During the Cv combustion event in the cylinder 12 the piston 14 transfers a moving force F1 to the triangle link 24 that in turn transfers this force to the crankpin 22 of the crankshaft 18. During this action the triangle link 24 rotates around upper joint 28 keeping the piston 14 at the same position in the cylinder 12, and this in turn allows for the combustion process to occur at a constant or nearly constant volume, while force F1 is converted into crankshaft torque. For example, acting forces at a given crank position may be derived by assuming that the triangle link 24 has two possible points of rotation, A and C. Connecting the two points C and D with a straight line allows force F1 to be transferred from point A to point B on this straight line. Resolving F1 into components gives:

F2=F1×h1/h2 where h1=B−C and h2=D−C.

F3 rotates the crank and rotates triangle around point A.

F4 rotates triangle around point C.

F5 shifts triangle along the line D-C.

F6 rotates the lever around pivot point E.

It is noted that the Engine with Isochoric Combustion 10 maybe characterized by certain optimal geometries, such as, for non-limiting example, the crank arm 20 and the radius link 26 having equal lengths, and triangle link 24 being an isosceles triangle.

While the Engine with Isochoric Combustion, and methods for the use thereof, has been described with respect to at least one embodiment, the engine and its method of use can be further modified within the spirit and scope of this disclosure, as demonstrated previously. This application is therefore intended to cover any variations, uses, or adaptations of the engine and method using its general principles. Further, this application is intended to cover such departures from the present disclosure as come within known or customary practice in the art to which the disclosure pertains and which fall within the limits of the appended claims.

What is claimed is:

1. A vehicle having an Engine with Isochoric Combustion, comprising:
   at least one piston arranged within at least one cylinder;
   a crankshaft having at least one crankpin offset from the centerline of the crankshaft by at least one crank arm;
   a connecting rod connected to the at least one piston and to an upper joint of a triangle link;
   the triangle link being connected to the at least one crankpin at a second joint of the triangle link;
   a radius link pivotally connected to the engine by a pivot pin at one end and connected to the triangle link at a third joint of the triangle link at its other end.

2. The vehicle of claim 1, wherein:
   by way of geometry of the linkage defined by the at least one crank arm, the triangle link, the radius link, and the connecting rod, and by way of the relative positions of the crankshaft, the at least one cylinder, and the pivot pin, during a crank angle segment, a Cylinder Volume during a combustion event is characterized by an extended dwell.

3. The vehicle of claim 2, wherein:
   during the extended dwell, the at least one piston, the connecting rod, and the triangle link continuing to transfer force to the at least one crankpin of the crankshaft.

4. The vehicle of claim 2, wherein:
   the combustion event being characterized by multiple fuel injection events.

5. The vehicle of claim 2, wherein:
   the at least one crank arm and the radius link being of equal length.

6. The vehicle of claim 2, wherein:
   the triangle link being an isosceles triangle.

7. An Engine with Isochoric Combustion, comprising:
   at least one piston arranged within at least one cylinder;
   a crankshaft having at least one crankpin offset from the centerline of the crankshaft by at least one crank arm;
   a connecting rod connected to the at least one piston and to an upper joint of a triangle link;
   the triangle link being connected to the at least one crankpin at a second joint of the triangle link;
   a radius link pivotally connected to the engine by a pivot pin at one end and connected to the triangle link at a third joint of the triangle link at its other end.

8. The engine of claim 7, wherein:
   by way of geometry of the linkage defined by the at least one crank arm, the triangle link, the radius link, and the connecting rod, and by way of the relative positions of the crankshaft, the at least one cylinder, and the pivot pin, during a crank angle segment, a Cylinder Volume during a combustion event is characterized by an extended dwell.

9. The engine of claim 8, wherein:
   during the extended dwell, the at least one piston, the connecting rod, and the triangle link continuing to transfer force to the at least one crankpin of the crankshaft.

10. The engine of claim 8, wherein:
    the combustion event being characterized by multiple fuel injection events.

11. The engine of claim 8, wherein:
    the at least one crank arm and the radius link being of equal length.

12. The engine of claim 8, wherein:
    the triangle link being an isosceles triangle.

13. A method of isochoric combustion in an engine, comprising the steps of:
    arranging a piston within a cylinder;
    providing a crankshaft having at least one crankpin offset from the centerline of the crankshaft;
    connecting a connecting rod to the at least one piston and to an upper joint of a triangle link;
    connecting the triangle link to the at least one crankpin at a second joint of the triangle link;
    pivotally connecting a radius link to the engine by a pivot pin at one end and to the triangle link at a third joint of the triangle link at its other end.

14. The method of claim 13, wherein:
    by way of geometry of the linkage defined by the at least one crank arm, the triangle link, the radius link, and the connecting rod, and by way of the relative positions of the crankshaft, the at least one cylinder, and the pivot pin, during a crank angle segment, a Cylinder Volume during a combustion event is characterized by an extended dwell.

15. The method of claim 14, wherein:
    during the extended dwell, the at least one piston, the connecting rod, and the triangle link continuing to transfer force to the at least one crankpin of the crankshaft.

16. The method of claim 14, wherein:
    the combustion event being characterized by multiple fuel injection events.

17. The method of claim 14, wherein:
    the at least one crank arm and the radius link being of equal length.

18. The method of claim 14, wherein:
    the triangle link being an isosceles triangle.

* * * * *